United States Patent
Park et al.

(10) Patent No.: US 10,185,565 B2
(45) Date of Patent: Jan. 22, 2019

(54) METHOD AND APPARATUS FOR CONTROLLING REGISTER OF RECONFIGURABLE PROCESSOR, AND METHOD AND APPARATUS FOR CREATING COMMAND FOR CONTROLLING REGISTER OF RECONFIGURABLE PROCESSOR

(71) Applicant: SAMSUNG ELECTRONICS CO., LTD., Suwon-si (KR)

(72) Inventors: Jae-un Park, Seoul (KR); Tai-song Jin, Seoul (KR); Do-hyung Kim, Hwaseong-si (KR); Suk-jin Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 261 days.

(21) Appl. No.: 15/100,452

(22) PCT Filed: Nov. 28, 2014

(86) PCT No.: PCT/KR2014/011595
§ 371 (c)(1),
(2) Date: Jul. 15, 2016

(87) PCT Pub. No.: WO2015/080534
PCT Pub. Date: Jun. 4, 2015

(65) Prior Publication Data
US 2016/0321073 A1    Nov. 3, 2016

(30) Foreign Application Priority Data
Nov. 29, 2013 (KR) .................. 10-2013-0147988

(51) Int. Cl.
*G06F 9/30* (2018.01)
*G06F 15/78* (2006.01)

(52) U.S. Cl.
CPC .......... *G06F 9/3013* (2013.01); *G06F 9/3004* (2013.01); *G06F 9/30098* (2013.01); *G06F 9/30141* (2013.01); *G06F 15/7867* (2013.01)

(58) Field of Classification Search
None
See application file for complete search history.

(56) References Cited

U.S. PATENT DOCUMENTS

| | | | | |
|---|---|---|---|---|
| 4,491,937 A | * | 1/1985 | Chan | G11C 11/4116 365/154 |
| 5,434,818 A | * | 7/1995 | Byers | G11C 7/1075 365/189.04 |

(Continued)

FOREIGN PATENT DOCUMENTS

| | | |
|---|---|---|
| JP | 2003-091499 A | 3/2003 |
| KR | 10-2006-0065462 A | 6/2006 |
| KR | 10-2008-0028410 A | 3/2008 |

OTHER PUBLICATIONS

International Search Report dated Mar. 5, 2015, issued in counterpart International Application No. PCT/KR2014/011595 [PCT/ISA/210].

(Continued)

*Primary Examiner* — Eric Coleman
(74) *Attorney, Agent, or Firm* — Sughrue Mion, PLLC

(57) ABSTRACT

Provided are a method and an apparatus for controlling a register of a reconfigurable processor. The power of a register may be efficiently used by obtaining a command for each of a plurality of read ports of the register from a memory, obtaining activation information for each of the plurality of read ports from the obtained command, and determining an address value of each of the plurality of read ports on the basis of the obtained activation information.

12 Claims, 5 Drawing Sheets

(56) References Cited

U.S. PATENT DOCUMENTS

| | | | |
|---|---|---|---|
| 5,731,738 A | 3/1998 | Bowles et al. | |
| 6,564,331 B1 | 5/2003 | Joshi | |
| 7,454,589 B2 | 11/2008 | Taniguchi et al. | |
| 7,865,587 B1* | 1/2011 | Jin | G06F 3/0607 709/223 |
| 2002/0046251 A1* | 4/2002 | Siegel | G06T 1/0007 709/213 |
| 2002/0078311 A1* | 6/2002 | Matsuzaki | G11C 7/1051 711/149 |
| 2004/0027857 A1* | 2/2004 | Ooishi | G11C 16/10 365/185.11 |
| 2006/0184846 A1* | 8/2006 | Hillier, III | G06F 11/1666 714/718 |
| 2006/0277425 A1 | 12/2006 | Renno et al. | |
| 2013/0097394 A1* | 4/2013 | Hatula | G06F 13/1663 711/154 |
| 2013/0117476 A1* | 5/2013 | Miller | G11C 7/1051 710/52 |

OTHER PUBLICATIONS

Written Opinion dated Mar. 5, 2015, issued in counterpart International Application No. PCT/KR2014/011595 [PCT/ISA/237].

* cited by examiner

FIG. 5A stage_cnt = 0

|  | raddr0 | raddr1 | raddr2 | raddr3 |
|---|---|---|---|---|
| cycle0 | 1 | 2 | 0 | 0 |
| cycle1 | 3 | 4 | 0 | 0 |
| cycle2 | 5 | 6 | 0 | 0 | stage_cnt = 1

|  | raddr0 | raddr1 | raddr2 | raddr3 |
|---|---|---|---|---|
| cycle3 | 2 | 3 | 1 | 1 |
| cycle4 | 4 | 5 | 1 | 1 |
| cycle5 | 6 | 7 | 1 | 1 | stage_cnt = 2

|  | raddr0 | raddr1 | raddr2 | raddr3 |
|---|---|---|---|---|
| cycle6 | 3 | 4 | 2 | 2 |
| cycle7 | 5 | 6 | 2 | 2 |
| cycle8 | 7 | 8 | 2 | 2 |

FIG. 5B stage_cnt = 0

|  | raddr0 | re0 | raddr1 | re1 | raddr2 | re2 | raddr3 | re3 |
|---|---|---|---|---|---|---|---|---|
| cycle0 | 1 | 1 | 2 | 1 | 0 | 0 | 0 | 0 |
| cycle1 | 3 | 1 | 4 | 1 | 0 | 0 | 0 | 0 |
| cycle2 | 5 | 1 | 6 | 1 | 0 | 0 | 0 | 0 | stage_cnt = 1

|  | raddr0 | re0 | raddr1 | re1 | raddr2 | re2 | raddr3 | re3 |
|---|---|---|---|---|---|---|---|---|
| cycle0 | 2 | 1 | 3 | 1 | 0 | 0 | 0 | 0 |
| cycle1 | 4 | 1 | 5 | 1 | 0 | 0 | 0 | 0 |
| cycle2 | 6 | 1 | 7 | 1 | 0 | 0 | 0 | 0 | stage_cnt = 0

|  | raddr0 | re0 | raddr1 | re1 | raddr2 | re2 | raddr3 | re3 |
|---|---|---|---|---|---|---|---|---|
| cycle0 | 3 | 1 | 4 | 1 | 0 | 0 | 0 | 0 |
| cycle1 | 5 | 1 | 6 | 1 | 0 | 0 | 0 | 0 |
| cycle2 | 7 | 1 | 8 | 1 | 0 | 0 | 0 | 0 |

METHOD AND APPARATUS FOR CONTROLLING REGISTER OF RECONFIGURABLE PROCESSOR, AND METHOD AND APPARATUS FOR CREATING COMMAND FOR CONTROLLING REGISTER OF RECONFIGURABLE PROCESSOR

TECHNICAL FIELD

The present invention relates to a method and an apparatus for controlling a register of a reconfigurable processor, and a method and an apparatus for generating a command for controlling a register of a reconfigurable processor.

BACKGROUND ART

Power efficiency of processor-based devices is of growing importance, and in particular, for devices powered by a battery, power efficiency is a key issue that has to be considered. Accordingly, various research into increasing the power efficiency of devices has been conducted recently.

In general, a register that stores pieces of information necessary for performing an operation of a processor includes a plurality of input/output ports so as to perform at least two operations simultaneously. Among the plurality of input/output ports, only some of them that are necessary for the processor to perform the operation may be used. In the related art, there is a problem in that, even when a read port from among the plurality of input/output ports is not used in the operation, every read port is assigned an arbitrary address value all the time and performs a meaningless operation.

DETAILED DESCRIPTION OF THE INVENTION

Technical Problem

The present invention provides a method of controlling a register of a reconfigurable processor, whereby power that is used in the register may be efficiently used by controlling an address value that is assigned to a read port in the register of the reconfigurable processor.

Technical Solution

According to an embodiment of the present invention, a method of controlling a register of a reconfigurable processor includes: obtaining a command for each of a plurality of read ports of the register from a memory; obtaining activation information for each of the plurality of read ports from the obtained command; and determining, based on the obtained activation information, an address value of each of the plurality of read ports.

Advantageous Effects

An address value of a read port which is not used in an operation may be fixed so as not to be changed during each cycle in which the operation is performed, and thus, power consumption in a register may be reduced.

DESCRIPTION OF THE DRAWINGS

FIG. 5A and FIG. 5B show a diagram of an address value that is assigned to a read port of a register, according to an embodiment of the present invention.

BEST MODE

Figure 1:
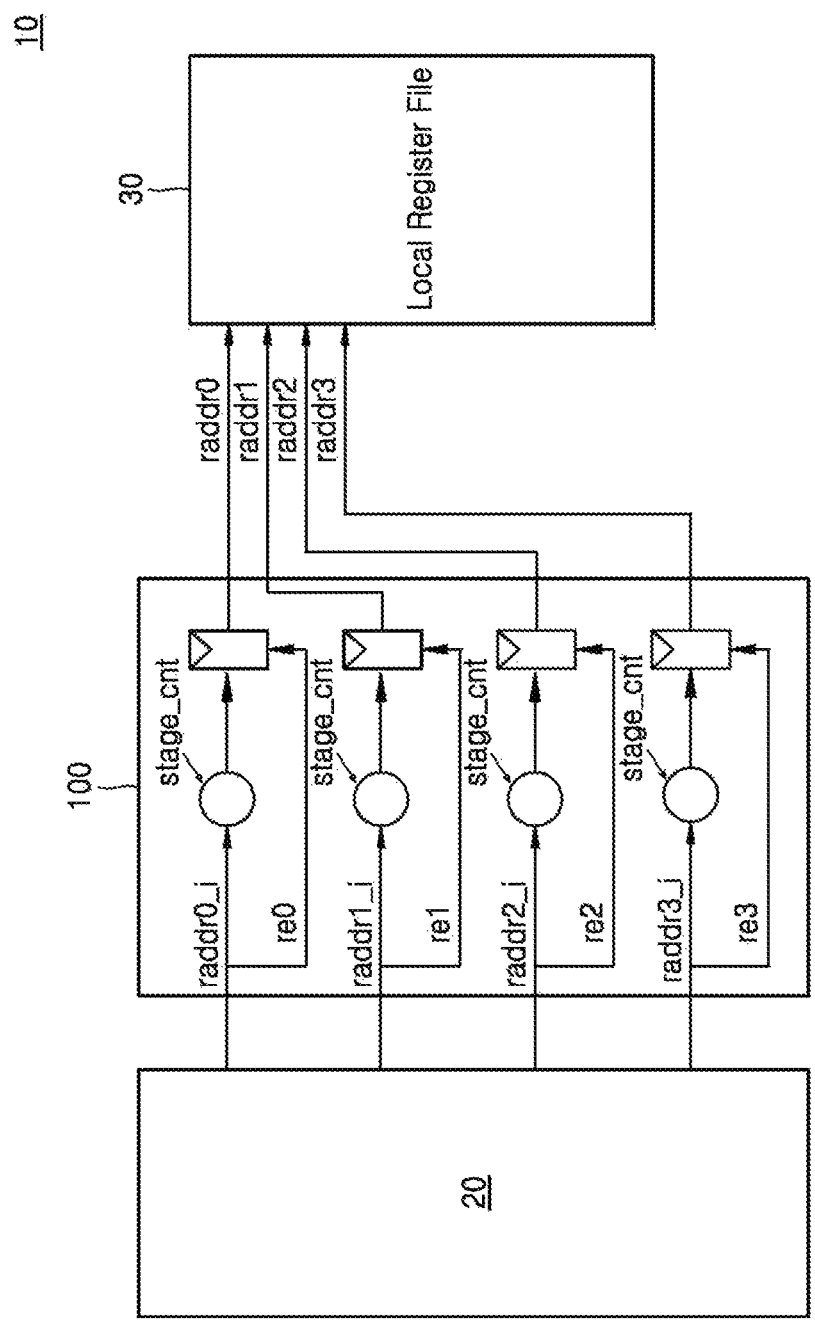
FIG. 1 is a conceptual diagram of a system for controlling a register, according to an embodiment of the present invention.

According to an embodiment of the present invention, a method of controlling a register of a reconfigurable processor includes: obtaining, from a memory, a command for each of a plurality of read ports of the register, obtaining, from the obtained command, activation information for each of the plurality of read ports; and determining, based on the obtained activation information, an address value of each of the plurality of read ports.

The determining of the address value may include: determining, based on the obtained activation information, at least one read port that is used in a predetermined cycle; extracting, for each of the determined at least one read port, an address value from the obtained command; and assigning the extracted address value to each of the determined at least one read port.

The determining of the at least one read port may include: for a first read port, the activation information of which has a first value, determining the first read port as being used in the predetermined cycle; and for a second read port, the activation information of which has a second value, determining the second read port as not being used in the predetermined cycle.

In a cycle after the predetermined cycle, an address value of a read port of the register that is not used may be maintained.

The assigning may include assigning a previously set address value to each of the plurality of read ports of the register, wherein the previously set address value of at least one read port that is not used may be maintained.

According to an embodiment of the present invention, a method of generating a command for controlling a register of a reconfigurable processor includes: detecting at least one read port that is used in a predetermined cycle, from among a plurality of read ports of the register, and generating a command including an address value and an activation code that are assigned to each of the detected at least one read port in the predetermined cycle.

The method may further include generating, for a read port that is not used in the predetermined cycle, a command including an inactivation code.

According to an embodiment of the present invention, an apparatus for controlling a register of a reconfigurable processor includes: an input/output unit configured to obtain, from a memory, a command for each of a plurality of read ports of the register, an activation information obtaining unit configured to obtain, from the obtained command, activation information for each of the plurality of read ports; and a controller configured to determine, based on the obtained activation information, an address value of each of the plurality of read ports.

The controller may be further configured to determine, based on the obtained activation information, at least one read port that is used in a predetermined cycle, extract, for each of the determined at least one read port, an address value from the obtained command, and assign the extracted address value to each of the determined at least one read port.

The controller may be further configured to determine, for a first read port, the obtained activation information of which has a first value, the first read port as being used in the predetermined cycle, and determine, for a second read port, the obtained activation information of which has a second value, the second read port as not being used in the predetermined cycle.

The controller may be further configured to control a read port that is not used to maintain, in a cycle after the predetermined cycle, an address value in the predetermined cycle.

The controller may be further configured to assign a previously set address value to each of the plurality of read ports of the register and control at least one read port that is not used to maintain the previously set address value.

According to an embodiment of the present invention, an apparatus for generating a command for controlling a register of a reconfigurable processor includes: a controller configured to detect at least one read port that is used in a predetermined cycle, from among a plurality of read ports of the register; and a command generator configured to generate a command including an address value and an activation code that are assigned to each of the detected at least one read port in the predetermined cycle.

The command generator may be configured to generate, for a read port that is not used in the predetermined cycle, a command including an inactivation code.

Mode of the Invention

Embodiments of the present invention will be described in detail below with reference to the accompanying drawings for one of ordinary skill in the art to be able to practice the embodiments of the present invention without any difficulty. The invention may, however, be embodied in many different forms and should not be construed as being limited to the embodiments set forth herein. In addition, parts in the drawings unrelated to the detailed description are omitted to ensure clarity of the present invention, and like reference numerals denote like elements throughout the specification.

Throughout the specification, it will be understood that when a portion is referred to as being "connected" to another portion, it may be "directly connected" to the other portion or "electrically connected" to the other portion with intervening devices therebetween. It will be further understood that when a portion is referred to as "including" or "comprising" an element, unless otherwise defined, the portion may further include another element, not excluding the other element.

Hereinafter, the present invention will be described in detail with reference to the accompanying drawings.

FIG. 1 is a conceptual diagram of a system 10 for controlling a register, according to an embodiment of the present invention.

In the system 10 for controlling the register, shown in FIG. 1, only the elements that are related to the present embodiment are shown. Accordingly, it may be understood by one of ordinary skill in the art related to the present embodiment that other general-purpose elements may be further included in addition to the elements shown in FIG. 1.

Referring to FIG. 1, the system 10 for controlling the register may include a configuration memory 20, an apparatus 100 for controlling the register of a reconfigurable processor (hereinafter referred to as a register controlling apparatus), and a register 30.

The configuration memory 20 stores configuration information of a reconfiguration array (not shown) which is included in the reconfigurable processor. The configuration information may include instruction information which is assigned to each functional unit (FU) independently operating in the reconfiguration array and information about a connection status of a plurality of FUs. Accordingly, an instruction which is mapped in each FU and the connection status between the plurality of FUs may vary according to the configuration information stored in the configuration memory 20.

Meanwhile, the configuration memory 20 according to an embodiment of the present invention may store a command for controlling the register 30. Here, the command for controlling the register 30 may be generated in an external device. The configuration memory 20 may transmit the stored command for controlling the register 30 to the register controlling apparatus 100.

The register controlling apparatus 100 may obtain the command for controlling the register 30 from the configuration memory 20. The register controlling apparatus 100 may control use of ports included in the register 30, based on the obtained command for controlling the register 30.

The register controlling apparatus 100 may obtain activation information re# for determining whether to use each of the ports of the register 30, from the command for controlling the register 30. The activation information will be described in detail below with reference to FIGS. 2 and 3.

The register controlling apparatus 100 according to an embodiment of the present invention may control the register 30 to efficiently use power, by decreasing power used in meaningless operations which are performed in the ports that are not used.

The register 30 may include a control register file (CRF), a data register file (DRF), and a local data register file (LDRF). The number of ports included in the register 30 may be determined based on the maximum number of ports necessary for performing an operation. Accordingly, in general, there may be ports in the register 30 that are not used to perform the operation.

For example, in the case of a read port, even when not used, the read port may be assigned an arbitrary address value that is stored in the configuration memory 20. Also, during each cycle in which the operation is performed, the arbitrary address value may be differently assigned to the read port that is not used. When, during each cycle, a different address value is assigned to the read port that is not used in the operation, the different address value may be accessed during each cycle even though it is a meaningless operation, and thus, power may be meaninglessly consumed.

Hereinafter, the read port from among at least one port included in the register 30 will be described. However, this is just an embodiment of the invention, and a method of controlling a register according to an embodiment of the present invention may be applied to other types of ports as well.

Figure 2:
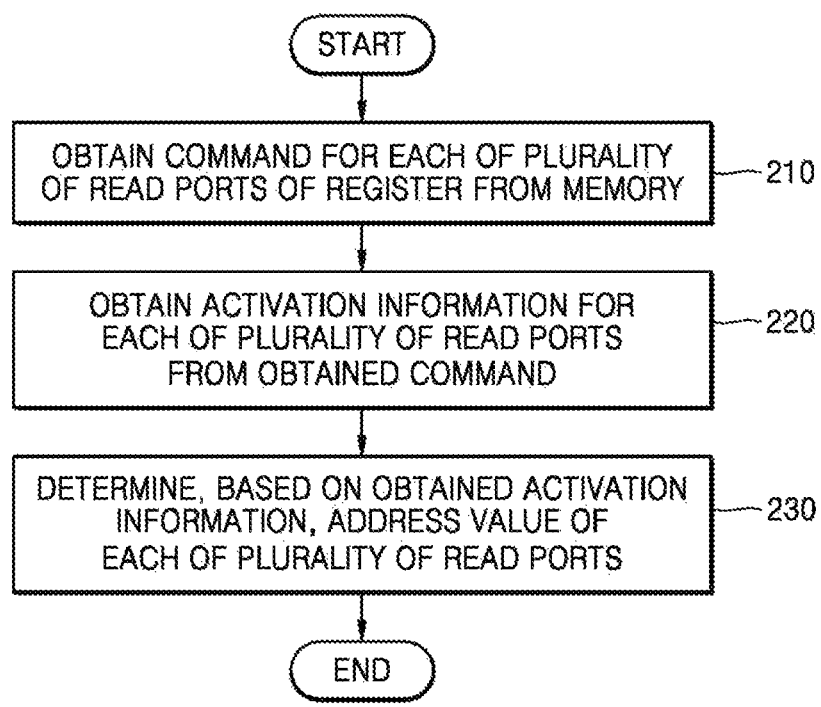
FIG. 2 is a flowchart of a method of controlling a register, according to an embodiment of the present invention.

FIG. 2 is a flowchart of a method of controlling a register, according to an embodiment of the present invention.

In operation 210, the register controlling apparatus 100 may obtain, from the configuration memory 20, a command for each of a plurality of read ports of the register 30. The register controlling apparatus 100 may control the register 30, based on the obtained command. Here, the command may include information for identifying a corresponding read port, a code for performing a read operation, and address value information necessary for reading a predetermined location in the register 30.

Also, the command according to an embodiment of the present invention may include activation information for each of the plurality of read ports, the activation information including information about whether each read port performs an operation.

Meanwhile, as in FIG. 1, the register controlling apparatus 100 may be connected outside of the register 30. However, this is just an embodiment of the present invention, and the register controlling apparatus 100 may be included in the register 30.

In operation 220, the register controlling apparatus 100 may obtain, from the obtained command, activation information for each of the plurality of read ports.

The register controlling apparatus 100 may decode an area of the command that includes activation information about the read port. For example, a $17^{th}$ bit including activation information may be decoded from the command composed of 32 bits to obtain activation information.

According to an embodiment of the present invention, when a $17^{th}$ bit of a predetermined command has a first value, it may be confirmed that the read port corresponding to the predetermined command is used in the operation. Meanwhile, when the $17^{th}$ bit of the predetermined command has a second value, it may be confirmed that the read port corresponding to the predetermined command is not used in the operation. Here, the first value and the second value may vary according to a setting of a user.

In operation 230, the register controlling apparatus 100 may determine, based on the obtained activation information, an address value of each of the plurality of read ports.

The register controlling apparatus 100 may determine an address value that is assigned to the read port of the register 30, based on whether the read port is used in the operation. For example, the register controlling apparatus 100 may confirm that the read port corresponding to a predetermined command is used in the operation, and the read port that is assigned the predetermined command is a third read port. In this case, the register controlling apparatus 100 may change an address value that is assigned to the third read port into an address value included in the predetermined command.

Meanwhile, the register controlling apparatus 100 may confirm that the read port corresponding to the predetermined command is not used in the operation, and the read port that is assigned the predetermined command is a second read port. In this case, the register controlling apparatus 100 may maintain an address value of the second read port without making a change.

The register controlling apparatus 100 may fix an address value of the read port that is not used in the operation so that the address value is not changed during each cycle in which the operation is performed, thereby reducing power that is consumed in the register 30.

Figure 3:
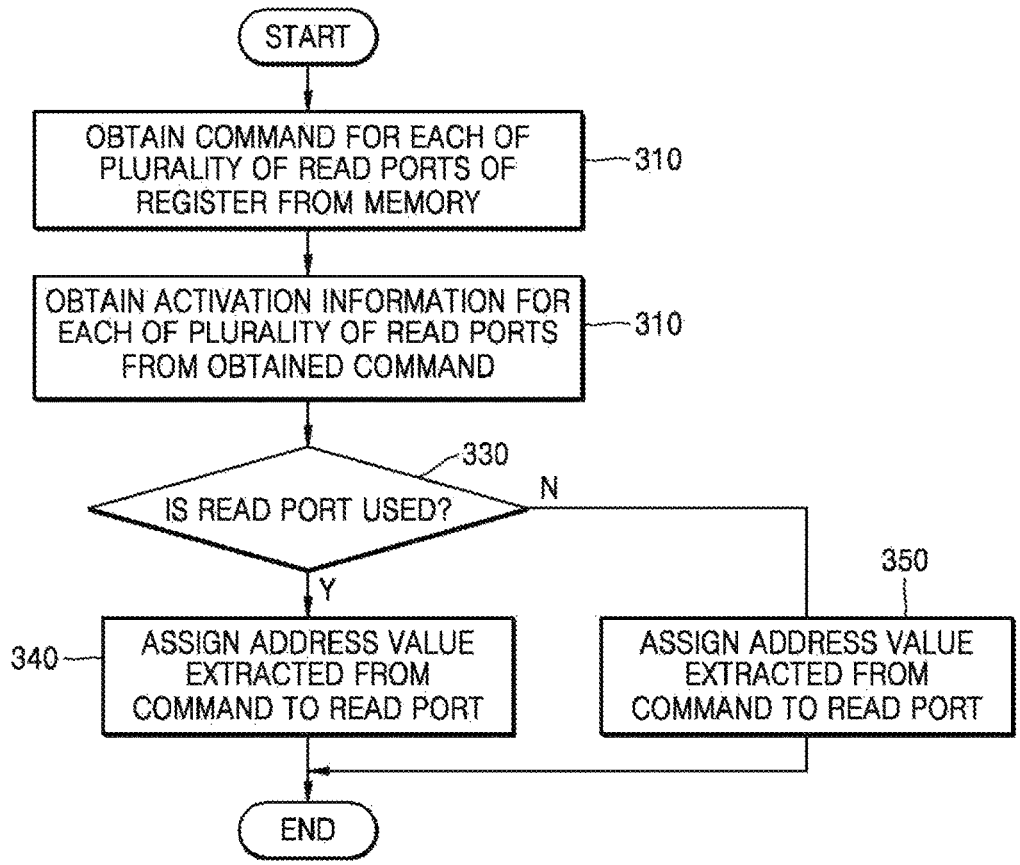
FIG. 3 is a detailed flowchart of a method of controlling a register, according to an embodiment of the present invention.

FIG. 3 is a detailed flowchart of a method of controlling the register 30, according to an embodiment of the present invention.

In operation 310, the register controlling apparatus 100 may obtain, from the configuration memory 20, a command for each of a plurality of read ports of the register 30. The register controlling apparatus 100 may control the register 30, based on the obtained command. Here, operation 310 may correspond to operation 210 of FIG. 2.

In operation 320, the register controlling apparatus 100 may obtain, from the obtained command, activation information for each of the plurality of read ports. The register controlling apparatus 100 may determine whether a read port corresponding to the obtained command is used to perform an operation, based on the activation information. Here, operation 320 may correspond to operation 220 of FIG. 2.

In operation 330, the register controlling apparatus 100 may determine whether each read port of the register 30 is used to perform the operation.

When the activation information extracted from the command has a first value, the register controlling apparatus 100 may determine that the read port that is assigned the command having the activation information that has the first value is used in the operation. Also, when the activation information extracted from the command has a second value, the register controlling apparatus 100 may determine that the read port that is assigned the command having the activation information that has the second value is not used in the operation.

In operation 340, the register controlling apparatus 100 may assign an address value extracted from the command to the read port corresponding to the command.

When the read port corresponding to the command is used in the operation, the register controlling apparatus 100 according to an embodiment of the present invention may assign the address value extracted from the command. For example, when the activation information of the command has a first value, the register controlling apparatus 100 may determine an address value of the read port as the address value extracted from the command.

In operation 350, the register controlling apparatus 100 may maintain an original value without changing an address value of the read port corresponding to the command.

When the read port corresponding to the command is not used in the operation, the register controlling apparatus 100 according to an embodiment of the present invention may maintain an existing address value.

For example, when the activation information of the command has a second value, the register controlling apparatus 100 may maintain the address value of the read port as a previously set value. Here, the previously set value may be an initialized address value of each read port of the register 30. For example, the register 30 may be initialized so that address value 0 is assigned to every read port of the register 30. In this case, the register controlling apparatus 100 may maintain an address value of the read port that is not used in the operation as 0.

As another example, the register controlling apparatus 100 may determine the address value of the read port that is not used in the operation as an arbitrary value stored in the register controlling apparatus 100. For example, the register controlling apparatus 100 may determine an address value of the read port that is not used during each cycle in which the operation is performed as n.

Figure 4:
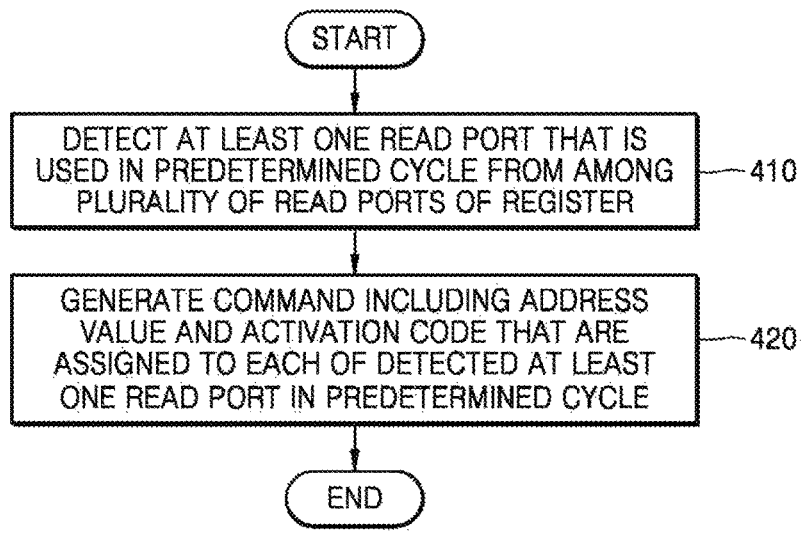
FIG. 4 is a flowchart of a method of generating a command for controlling a register of a reconfigurable processor, according to an embodiment of the present invention.

FIG. 4 is a flowchart of a method of generating a command for controlling a register of a reconfigurable processor, according to an embodiment of the present invention.

In operation 410, an apparatus for generating the command for controlling the register of the reconfigurable processor (hereinafter referred to as a command generating apparatus) may detect at least one read port that is used in a predetermined cycle, from among a plurality of read ports of the register 30.

Here, the command generating apparatus may be a compiler that generates an operation code that may be performed on the reconfigurable processor. This is just an embodiment of the present invention, and the command generating apparatus may be a device that performs a function of generating an operation code that may be performed on the reconfigurable processor.

Also, the at least one read port that is used in the predetermined cycle may include read ports that are assigned commands about operations that are performed in the predetermined cycle, that is, simultaneously.

In operation 420, the command generating apparatus may generate a command including an address value and an activation code that are assigned to each of the detected at least one read port in the predetermined cycle. The command may also include information for identifying a read port that the command corresponds to.

The command generating apparatus may generate the command by combining an operation code for each of the operations that are performed simultaneously and activation information for controlling the register 30. Here, the activation information may have a first value when the read port corresponding to the command is used in an operation and may have a second value when a read port that the command does not correspond to is not used in the operation.

FIG. 5A and FIG. 5B show a diagram of an address value that is assigned to a read port of the register 30, according to an embodiment of the present invention.

FIG. 5A shows an address value that is assigned to each read port in a general register. Here, it may be supposed that read port 2 corresponding to raddr2 and read port 3 corresponding to raddr3 are not used in an operation.

Referring to FIG. 5A, it may be confirmed that the address value that is assigned to every read port of the register changes after every 3 cycles. In the cases of read port 2 and read port 3, although they are not used in the operation, respective address values continuously change from 0 to 1 and from 1 to 2.

The general register has a different address value assigned to the read port that is not used, as well, whenever the operation is performed, and thus, although it is meaningless data to the operation, data corresponding to the different address value has to be read every time.

FIG. 5B shows an address value that is assigned to each read port in a register according to an embodiment of the present invention, FIG. 5B also illustrates activation information re# for each read port.

By using activation information about the read port, the register controlling apparatus 100 may confirm that read port 2 corresponding to raddr2 and read port 3 corresponding to raddr3 are not used in an operation.

Referring to FIG. 5B, it may be confirmed that address values that are assigned to read port 2 and read port 3, which are not used in the operation, are not changed but fixed at 0. Here, that the register controlling apparatus 100 fixes the address values as 0 is just an embodiment of the present invention, and the present invention is not limited thereto.

The register controlling apparatus 100 according to an embodiment of the present invention may maintain an address value of the read port as a previously set value. Here, the previously set value may be an initialized address value of each read port of the register 30. For example, the register 30 may be initialized so that address value 0 is assigned to every each read port of the register 30. In this case, the register controlling apparatus 100 may maintain an address value of the read port that is not used in the operation as 0.

As another example, the register controlling apparatus 100 may determine the address value of the read port that is not used in the operation as an arbitrary value stored in the register controlling apparatus 100. For example, the register controlling apparatus 100 may determine an address value of the read port that is not used during each cycle in which the operation is performed as n.

Figure 6:
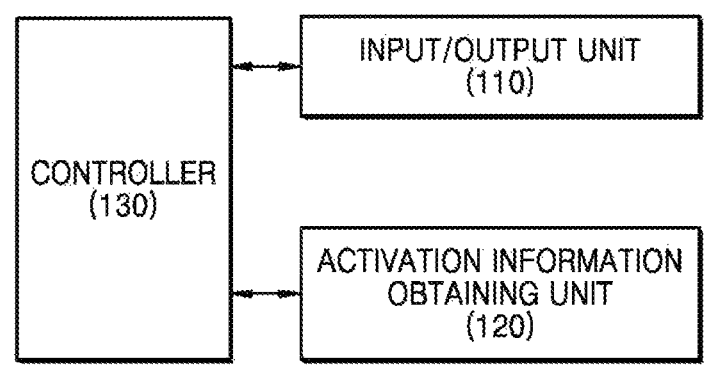
FIG. 6 is a block diagram of a register controlling apparatus, according to an embodiment of the present invention.

FIG. 6 is a block diagram of the register controlling apparatus 100, according to an embodiment of the present invention.

In the register controlling apparatus 100 shown in FIG. 6, only the elements that are related to the present embodiment are shown. Accordingly, it may be understood by one of ordinary skill in the art related to the present embodiment that other general-purpose elements may be further included in addition to the elements shown in FIG. 6.

Referring to FIG. 6, the register controlling apparatus 100 may include an input/output unit 110, an activation information obtaining unit 120, and a controller 130.

The input/output unit 110 may obtain, from the configuration memory 20, a command for each of a plurality of read ports of the register 30. The input/output unit 110 may control the register 30, based on the obtained command. Here, the command may include information for identifying a corresponding read port, a code for performing a read operation, and address value information necessary for reading a predetermined location in the register 30.

Also, the command according to an embodiment of the present invention may include activation information for each of the plurality of read ports, the activation information including information about whether each read port performs an operation.

The activation information obtaining unit 120 may obtain, from the obtained command, activation information for each of the plurality of read ports.

The activation information obtaining unit 120 may decode an area of the command that includes activation information about the read port. For example, a $17^{th}$ bit including activation information may be decoded from the command composed of 32 bits to obtain activation information.

According to an embodiment of the present invention, when a $17^{th}$ bit of a predetermined command has a first value, it may be confirmed that the read port corresponding to the predetermined command is used in the operation. Meanwhile, when the $17^{th}$ bit of the predetermined command has a second value, it may be confirmed that the read port corresponding to the predetermined command is not used in the operation. Here, the first value and the second value may vary according to a setting of a user.

The controller 130 may determine, based on the obtained activation information, an address value of each of the plurality of read ports. The controller 130 may determine an address value that is assigned to the read port of the register 30, based on whether the read port is used in the operation.

When the read port corresponding to the command is used in the operation, the controller 130 may assign an address value extracted from the command. For example, when the activation information of the command has a first value, the register controlling apparatus 100 may determine an address value of the read port as the address value extracted from the command.

When the read port corresponding to the command is not used in the operation, the controller 130 may maintain an existing address value. For example, when the activation information of the command has a second value, the controller 130 may maintain the address value of the read port as a previously set value. Here, the previously set value may be an initialized address value of each read port of the register 30. For example, the register 30 may be initialized so that address value 0 is assigned to every each read port of the register 30. In this case, the controller 130 may maintain an address value of the read port that is not used in the operation as 0.

As another example, the controller 130 may determine the address value of the read port that is not used in the operation as an arbitrary value stored in the controller 130. For example, the controller 130 may determine an address value of the read port that is not used during each cycle in which the operation is performed as n.

Figure 7:
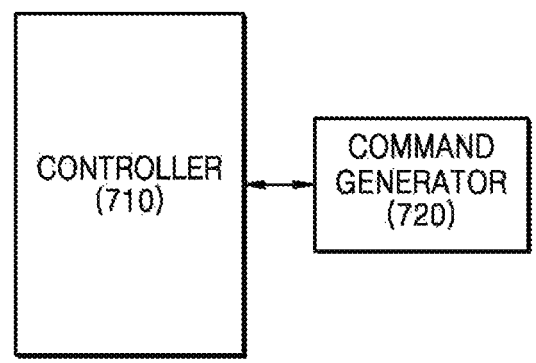
FIG. 7 is a block diagram of a command generating apparatus, according to an embodiment of the present invention.

FIG. 7 is a block diagram of a command generating apparatus 700, according to an embodiment of the present invention.

In the command generating apparatus 700 shown in FIG. 7, only the elements that are related to the present embodiment are shown. Accordingly, it may be understood by one of ordinary skill in the art related to the present embodiment that other general-purpose elements may be further included in addition to the elements shown in FIG. 7.

Referring to FIG. 7, the command generating apparatus 700 may include a controller 710 and a command generator 720. Here, the command generating apparatus 700 may be a compiler that generates an operation code that may be performed on a reconfigurable processor. Meanwhile, this is just an embodiment of the present invention, and the command generating apparatus may be a device that performs a function of generating an operation code that may be performed on the reconfigurable processor.

The command generating apparatus 700 may transmit a generated command to the configuration memory 20 of FIG. 1. The configuration memory 20 may store the command received from the command generating apparatus 700.

The controller 710 may detect at least one read port that is used in a predetermined cycle, from among a plurality of read ports of the register 30. Here, the at least one read port that is used in the predetermined cycle may include read ports that are assigned commands about operations that are performed in the predetermined cycle, that is, simultaneously.

The command generator 720 may generate a command including an address value and an activation code that are assigned to each of the detected at least one read port in the predetermined cycle. The command may also include information for identifying a read port that the command corresponds to.

The command generator 720 may generate the command by combining an operation code for each of the operations that are performed simultaneously and activation information for controlling the register 30. Here, the activation information may have a first value when the read port that the command corresponds to is used in an operation and may have a second value when a read port that the command does not correspond to is not used in the operation.

The apparatus described herein may include a processor, a memory for storing and executing program data, a permanent storage such as a disk drive, a communication port for handling communications with external devices, and user interface devices such as a touch panel, a key, and a button. The methods that are implemented as software modules or algorithms may be stored as program instructions or computer-readable codes executable by the processor on a computer-readable recording medium. Here, examples of the computer-readable recording medium include magnetic storage media (e.g., read only memory (ROM), random access memory (RAM), floppy disk, or hard disk), optically readable media (e.g., compact disk-read only memory (CD-ROM) or digital versatile disk (DVD)), etc. The computer-readable recording medium may be distributed over network coupled computer systems, and thus, the computer-readable code may be stored and executed in a distributed fashion. This medium may be read by the computer, stored in the memory, and executed by the processor.

All references, including publications, patent applications, and patents, cited herein are hereby incorporated by reference to the same extent as if each reference were individually and specifically indicated to be incorporated by reference or were set forth in its entirety herein.

For the purposes of promoting an understanding of the invention, reference has been made to the exemplary embodiments illustrated in the drawings, and specific language has been used to describe embodiments of the present invention. However, no limitation of the invention is intended by this specific language, and the present invention may encompass all the elements that would normally occur to one of ordinary skill in the art.

The present invention may be described in terms of functional block configurations and various processing steps. Such functional blocks may be realized by any number of hardware and/or software configurations configured to perform the specified functions. For example, the present invention may employ integrated circuit configurations. e.g., memory elements, processing elements, logic elements, look-up tables, and the like, which may carry out a variety of functions under the control of one or more microprocessors or other control apparatuses. Similarly, where the elements of the present invention may be implemented using software programming or software elements, the present invention may be implemented with any programming or scripting language such as C. C++, Java, assembler, or the like, with the various algorithms being implemented with any combination of data structures, processes, routines or other programming configurations. Functional aspects may be implemented in algorithms that execute on one or more processors. Also, the present invention could employ the related art for electronic environment setting, signal processing and/or data processing, etc. The words such as "mechanism", "element", "means", and "configuration" may be used broadly and are not limited to mechanical or physical configurations, but can include software routines in conjunction with processors, etc.

The particular implementations shown and described herein are illustrative examples of the invention and are not intended to otherwise limit the scope of the invention in any way. For the sake of brevity, electronic configurations of the related art, control systems, software, and other functional aspects of the systems may not be described in detail. Also, the connecting lines or connectors shown in the various figures presented are intended to represent exemplary functional relationships and/or physical or logical couplings between the various elements. It should be noted that many alternative or additional functional connections, physical connections, or circuit connections may be present in a practical apparatus. In addition, unless an element is specifically described as "essential" or "critical", the element may not be essential to the practice of the invention.

The invention claimed is:

1. A method of controlling a register of a reconfigurable processor, the method comprising:
   obtaining a command for each of a plurality of read ports of the register;
   obtaining, from the obtained command, activation information for each of the plurality of read ports;
   determining, based on the obtained activation information, whether each of the plurality of read ports is used in an operation; and
   assigning a previously set address value to a first read port not used in the operation among the plurality of read ports, and an address value obtained from the command to a second read port used in the operation among the plurality of read ports,
   wherein the previously set address value indicates a location to be accessed via the first read port and the address value obtained from the command indicates a location to be accessed via the second read port.

2. The method of claim 1, wherein the assigning the address value comprises:
   extracting the address value from the obtained command.

3. The method of claim 1, wherein the determining comprises:
   for the first read port, the activation information of which has a first value, determining the first read port as not being used in a predetermined cycle; and
   for the second read port, the activation information of which has a second value, determining the second read port as being used in the predetermined cycle.

4. The method of claim 3, wherein, in a cycle after the predetermined cycle, in response to the first read port not being used, the previously set address value of the first read port is maintained.

5. A method of generating a command for controlling a register of a reconfigurable processor, the method comprising:
   detecting at least one read port that is used in a predetermined cycle, from among a plurality of read ports of the register; and
   generating a command comprising an address value and an activation code that are assigned to each of the detected at least one read port in the predetermined cycle,
   wherein the address value obtained from the command is assigned to the at least one read port used in the predetermined cycle,
   the address value obtained from the command indicates a location to be accessed via the at least one read port,
   a previously set address value is assigned to another read port not used in the predetermined cycle among the plurality of read ports, and
   the previously set address value indicates a location to be accessed via the another read port.

6. An apparatus for controlling a register of a reconfigurable processor, the apparatus comprising:
   an input/output unit configured to obtain a command for each of a plurality of read ports of the register; and
   at least one processor configured to obtain, from the obtained command, activation information for each of the plurality of read ports,
   to determine, based on the obtained activation information, whether each of the plurality of read ports is used in an operation and to assign a previously set address value to a first read port not used in the operation among the plurality of read ports and an address value obtained from the command to a second read port used in the operation among the plurality of read ports,
   wherein the previously set address value indicates a location to be accessed via the first read port and the address value obtained from the command indicates a location to be accessed via the second read port.

7. The apparatus of claim 6, wherein the at least one processor is further configured to extract the address value from the obtained command.

8. The apparatus of claim 6, wherein the at least one processor is further configured to determine, for the first read port, the obtained activation information of which has a first value, the first read port as not being used in a predetermined cycle, and determine, for the second read port, the obtained activation information of which has a second value, the second read port as being used in the predetermined cycle.

9. The apparatus of claim 8, wherein the at least one processor is further configured to control the previously set address value of the first read port being maintained, in response to the first read port not being used in a cycle after the predetermined cycle.

10. An apparatus for generating a command for controlling a register of a reconfigurable processor, the apparatus comprising:
    at least one processor configured to detect at least one read port that is used in a predetermined cycle, from among a plurality of read ports of the register and
    to generate a command comprising an address value and an activation code that are assigned to each of the detected at least one read port in the predetermined cycle,
    wherein the address value obtained from the command is assigned to the at least one read port used in the predetermined cycle,
    the address value obtained from the command indicates a location to be accessed via the at least one read port,
    a previously set address value is assigned to another read port not used in the predetermined cycle among the plurality of read ports, and
    the previously set address value indicates a location to be accessed via the another read port.

11. A non-transitory computer-readable recording medium having recorded thereon a program for implementing, when executed by a computer, the method of claim 1.

12. A non-transitory computer-readable recording medium having recorded thereon a program for implementing, when executed by a computer, the method of claim 5.

* * * * *